May 27, 1952 P. M. BOLIEK 2,598,494
WEIGHING APPARATUS
Filed Sept. 6, 1949 3 Sheets-Sheet 1
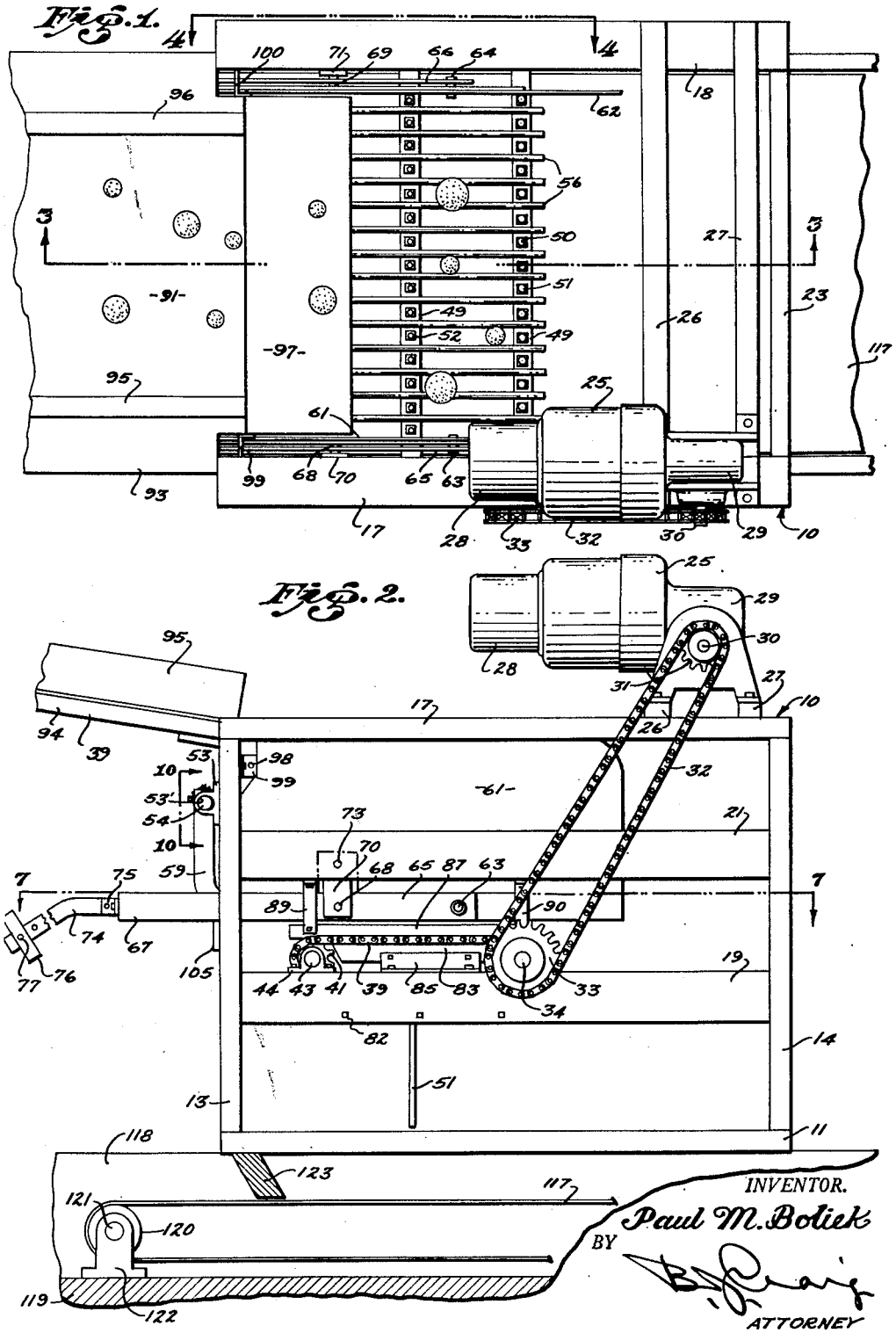
INVENTOR.
Paul M. Boliek
BY
ATTORNEY May 27, 1952 P. M. BOLIEK 2,598,494
WEIGHING APPARATUS
Filed Sept. 6, 1949 3 Sheets-Sheet 2
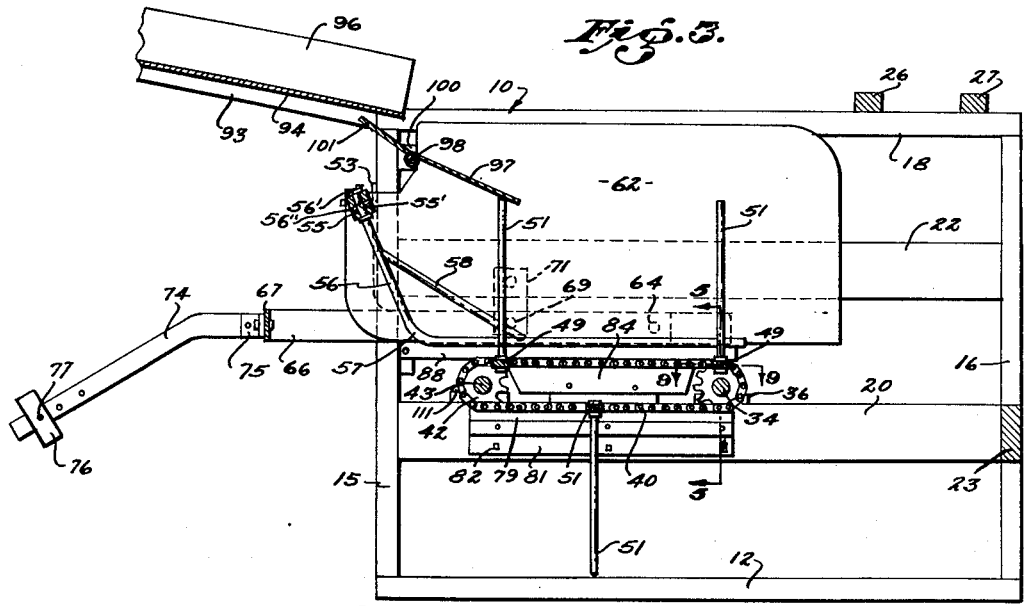
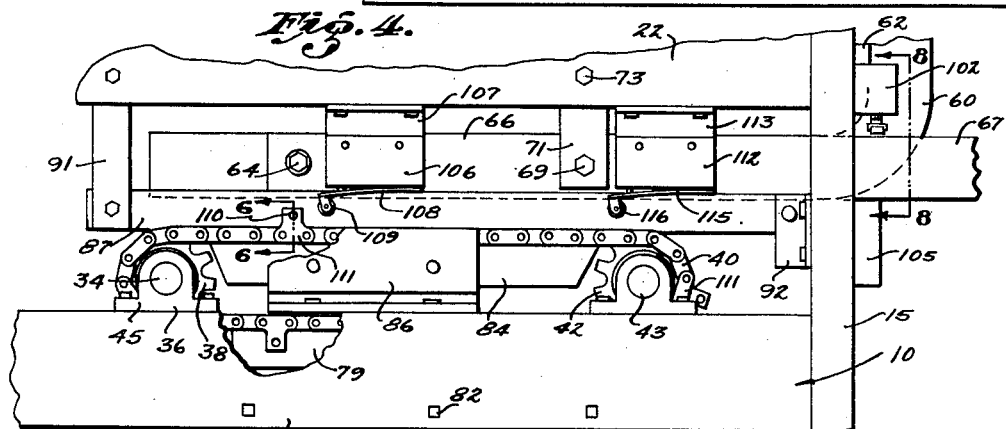
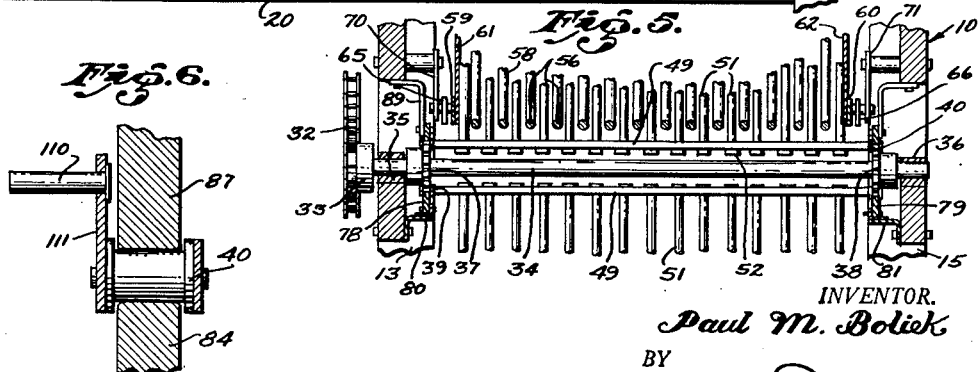
INVENTOR.
Paul M. Boliek
BY
ATTORNEY May 27, 1952  P. M. BOLIEK  2,598,494
WEIGHING APPARATUS
Filed Sept. 6, 1949  3 Sheets-Sheet 3
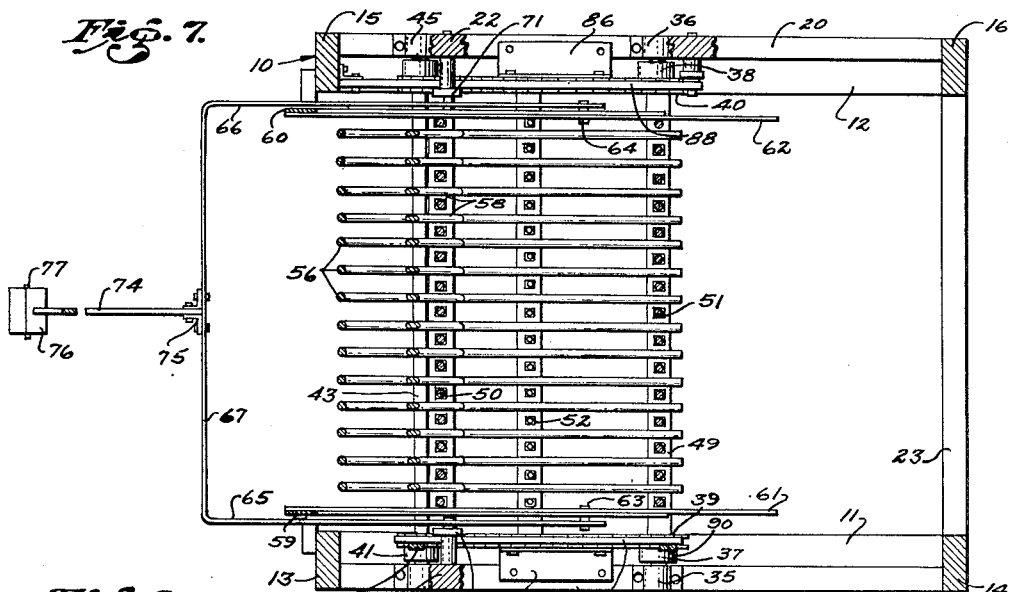
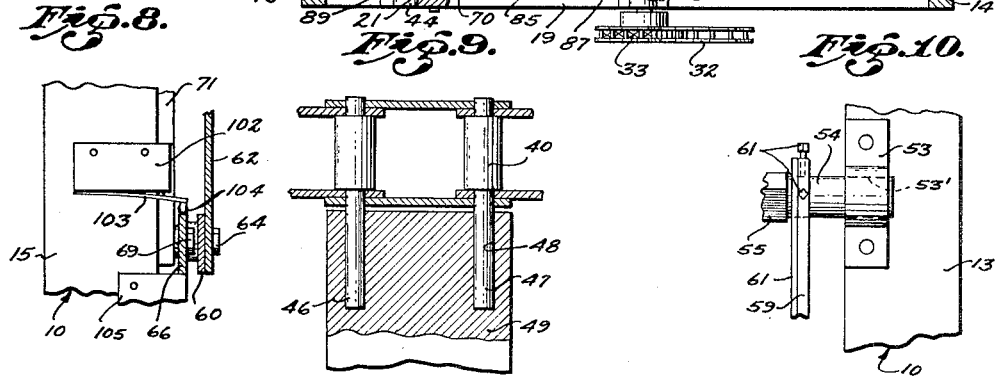
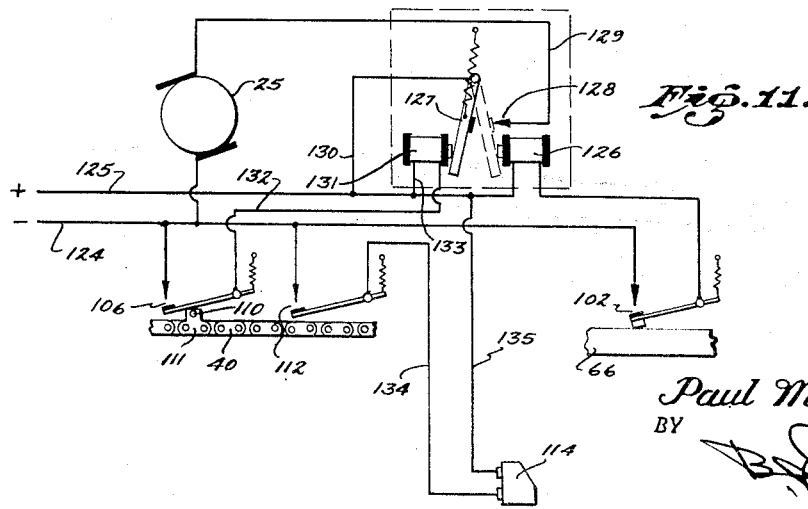
INVENTOR.
Paul M. Boliek
BY
ATTORNEY Patented May 27, 1952

2,598,494

UNITED STATES PATENT OFFICE 2,598,494

WEIGHING APPARATUS

Paul M. Boliek, Anaheim, Calif.

Application September 6, 1949, Serial No. 114,103

6 Claims. (Cl. 249—16)

This invention relates to a weighing apparatus and more particularly to an apparatus adapted to weigh predetermined quantities of fruit or like foods.

Heretofore when various growers produce was processed by a packing house, it has been extremely difficult to ascertain the exact weight of damaged or unuseable fruit when the fruit from the various growers is all deposited in a single storage bin. The equipment used in this connection has heretofore been relatively complicated and subject to frequent breakdown.

Therefore it is the main object of this invention to provide a novel apparatus to weigh predetermined quantities of fruit or other products.

Another object of the invention is to provide a novel fruit weighing apparatus which is relatively simple in construction.

A further object of the invention is to provide a novel fruit weighing rack.

A further object of the invention is to provide a novel means for removing fruit from a weighing rack.

Other objects and advantages of the invention will be apparent from the following description taken in connection with the accompanying drawings, wherein:

Fig. 1 is a top plan view of the weighing apparatus;

Fig. 2 is a side elevation of the weighing apparatus;

Fig. 3 is an elevational, sectional view taken substantially on line 3—3, Fig. 1;

Fig. 4 is a fragmentary, enlarged side elevational view taken substantially on line 4—4, Fig. 1;

Fig. 5 is a fragmentary, enlarged, sectional view taken substantially on line 5—5, Fig. 3;

Fig. 6 is a fragmentary, enlarged, sectional view of the invention taken substantially on line 6—6, Fig. 4;

Fig. 7 is a horizontal sectional view of the weighing apparatus taken substantially on line 7—7, Fig. 2;

Fig. 8 is a fragmentary, sectional view of one of the electrical switches taken substantially on line 8—8, Fig. 4;

Fig. 9 is a fragmentary, enlarged, sectional view of part of the fruit removal mechanism taken substantially on line 9—9, Fig. 3;

Fig. 10 is a fragmentary, side elevational view taken as indicated by line 10—10, Fig. 2; and Fig. 11 is a schematic electrical wiring diagram used in connection with the present invention.

In the accompanying drawings the invention is shown as embodied in a weighing apparatus which includes a frame indicated generally at 10. The frame includes horizontal base members 11 and 12, vertical end members 13, 14, 15 and 16, top members 17 and 18, horizontal bearing support members 19 and 20, side brace members 21 and 22 and end brace member 23.

An electrical motor 25 is mounted on motor support members 26 and 27 fixed to the upper surface of the top members 17 and 18 of the frame. The motor 25 is of standard type, having a suitable brake 28 and a gear box 29, from which a shaft 30 extends. A sprocket 31, mounted on the shaft 30, is adapted to drive a chain 32, which in turn drives a sprocket 33 mounted on a shaft 34. The shaft 34 is journaled in bearing blocks 35 and 36, mounted on the bearing support members 19 and 20, and carries a pair of sprockets 37 and 38 adjacent the bearing blocks 35 and 36. The sprockets 37 and 38 carry chains 39 and 40 which engage sprockets 41 and 42 fixed to a shaft 43 journaled in bearing blocks 44 and 45 mounted on the bearing support members 19 and 20.

The chains 39 and 40, at spaced intervals, have opposed pairs of extended link pins 46 and 47 which, as shown in Fig. 9, fit in bores 48 in transverse rod supporting members 49. Thus the members 49 are held in position between the chains 39 and 40. Each rod supporting member 49 has a series of spaced holes 50 in which rods 51 are inserted. The rods may be held in place by nuts 52.

A pair of bearing blocks 53 mounted on the vertical frame members 13 and 15 adjacent the top members 17 and 18 support a shaft 54 which has a central square portion 55. A hole 53' in which the shaft 54 turns is slightly longer than the diameter of the shaft so that the shaft has a slight movement in the hole 53' to prevent binding of parts, as will be hereinafter understood. The portion 55 has spaced holes 55' which receive spaced fingers 56 which are held in place as by a collar 56', which latter may be held in place by pins 56'' or by other suitable fastening means. The fingers 56 are bent horizontally as at 57 to form the bottom of the weighing rack. Brace rods 58 may be welded across the angle formed by the bend 57 in the fingers 56 for additional support.

The fingers 56 are arranged intermediate the rods 51 and the shaft 54, outward of the squared portion 55, carries arms 59 and 60 which may be secured to the shaft 54 by set screws 61 as shown in Fig. 10. The arms 59 and 60 are fixed to side plates 61 and 62 which extend upwardly adjacent the top frame members 17 and 18, downwardly adjacent fingers 56 and outwardly beyond the ends of fingers 56 as shown in Fig. 3.

Pivots 63 and 64 on the inner end of arms 59 and 60 pivotally support the sides 65 and 66 of a U-shaped weight arm member 67. The member 67 is also pivotally supported as at 68 and 69 on bracket members 70 and 71, which are fixed to the brace members 21 and 22 as at 73.

An arm 74, fixed by means of brackets 75 to the member 67, supports a weight 76 which is shiftable along the arm 74 and may be secured in adjusted position by a pin 77.

In order to support the intermediate portions of the chains 39 and 40, a series of guides have been provided. The lower intermediate portions are supported by guides 78 and 79, fixed to angle brackets 80 and 81, which are in turn secured to bearing support members 19 and 20 as at 82. The lower side of the upper intermediate sections of the chains 39 and 40 are supported by guides 83 and 84, fixed to angle brackets 85 and 86 mounted on the bearing support members 19 and 20.

The upper face of the upper reaches of the chains is guided by guides 87 and 88, guide 87 being secured by brackets 89 and 90 to brace member 21 and guide 88 being supported at one end by bracket 91, fixed to brace member 22, and bracket 92, fixed to the vertical frame member 15.

A chute 93 is provided to deliver fruit to the weighing apparatus and, as shown, includes a base 94 fixed to the top frame members 17 and 18 and guide rails 95 and 96, secured in fixed parallel relationship.

The fruit to be weighed is delivered from the chute 93 onto an apron 97 which may be pivoted about a shaft 98, journaled in brackets 99 and 100. The brackets 99 and 100 are fixed to the vertical members 13 and 15. A dependent arm 101 (see Fig. 3), extending rearwardly from the shaft 98 and fixed to the apron 97, is adapted to engage the base 94 of the chute 93 to limit the downward movement of the apron 97. The end of the apron in normal position may rest upon the upper ends of the rods 51 carried by the rod supporting member 49.

A switch 102 is shown as fixed to the upright 15 (see Fig. 8), and carries a spring lever 103 and a roller 104. The roller 104 is adapted to be engaged by the upper edge of the side 66 of the U-shaped member 67 and thereby when the side 66 is moved upwardly the switch 102 may be actuated.

The downward movement of the side 66 is limited by stops 105 secured to the vertical members 13 and 15. As will be later described, the switch 102 is adapted to start the operation of the motor 25.

To stop the motor 25, a second switch 106, mounted on a bracket 107 fixed to the brace member 22, is provided. The switch 106 includes a spring arm 108 and a roller 109 and is adapted to be actuated by engagement of the roller 109 by a pin 110 carried by special links 111 (see Fig. 6) on the chain 40. The links 111 are equally spaced along the chain 40.

A third switch 112, mounted on a bracket 113 secured to the brace 22, is used to electrically actuate a counter 114. The switch 112 has a spring arm 115 and a roller 116 which may be engaged and moved by the pins 110.

In operation the fruit, such as oranges, lemons and the like, is delivered to the weighing apparatus by the chute 93 and falls into the receptacle defined by two rows of rods 51 at the ends, fingers 56 at the bottom and plates 61 and 62 at the sides. When a sufficient weight of fruit has been delivered into the receptacle to counter-balance the weight 76, fingers 56, together with the arms 59 and 60, will be forced downwardly about the pivots 63 and 64 and the shaft 54 and thus through pivots 68 and 69 move the arms 65 and 66 upwardly to engage the roller 104 and actuate the switch 102 to thus start the motor 25. The motor 25 drives the chain 32 and the chains 39 and 40, moving the rods 51 through the fingers 56 and pushing the fruit off these fingers to allow it to fall on a conveyor 117 (Fig. 1), arranged in a pit 118 in a floor 119. The conveyor 117 may be supported by a roller 120 mounted on a shaft 121 journaled in bearing blocks 122 secured to the bottom of the pit 118. A baffle 123, secured to the base frame members 11 and 12, may prevent any backward rolling of fruit.

It will be seen that when the rods 51 are moved another set of rods comes immediately into position to start a new receptacle and when the rods 51 have moved to their original position the switch 106 is actuated by one of the pins 110 and through the use of the brake 28 of the motor 25 the chains are stopped until the newly formed receptacle is again filled.

Referring now primarily to the wiring diagram in Fig. 11, power is brought in through leads 124 and 125 and when switch 102 is actuated by the arm 66 current is delivered to a solenoid 126 to move the arm 127 of a snapover switch into engagement with a contact 128 and thus through leads 129 and 130 the motor 25 will be started. When the pin 110 actuates the switch 106, current is delivered to a solenoid 131 through leads 132 and 133, thus removing the arm 127 out of engagement with the contact 128 and stopping the motor. The switch 112, which is also actuated by pins 110, causes current to be periodically delivered through leads 134 and 135 to the counter 114, causing the latter to be actuated to thereby record the number of times the weighed quantity of fruit passes through the apparatus.

From the foregoing description it will be apparent that I have invented a novel apparatus by means of which fruit may be handled readily and without damage and may be accurately weighed.

Having thus described my invention, I claim:

1. In a weighing apparatus, an endless member, means to support the endless member, a scale structure including spaced fingers disposed above the endless member and forming the bottom of a receptacle, spaced sets of spaced members carried by said endless member and movable between said fingers, one set of the spaced members forming one end of the receptacle, another set of the spaced members forming the other end of the receptacle, a motor connected to the endless member to drive the endless member, a switch for the motor actuated by the weight of objects in the receptacle when the weight is made to cause said motor to operate to cause the endless member to advance, means to stop the motor after it has advanced the endless member, a counting mechanism and an operating member carried by the endless member for operating the counting mechanism.

2. In a weighing apparatus, an endless conveyor, a scale structure including spaced fingers disposed above said conveyor, means to mount said fingers for up and down movement, sets of spaced members carried by said conveyor and movable between said fingers, said fingers forming the bottom of a receptacle, one set of the spaced members forming one end of the receptacle, another set of the spaced members forming the other end of the receptacle, a motor connected to the conveyor to drive the conveyor step-by-step, a switch for the motor actuated by the weight of objects in the receptacle when the weight is made to cause said motor to operate to cause the conveyor to advance, and means operated by the conveyor to stop the motor after it has advanced the conveyor.

3. In a weighing apparatus, an endless conveyor, a scale structure including spaced fingers disposed above said conveyor, means to mount said fingers for up and down movement, sets of spaced members carried by said conveyor and movable between said fingers, said fingers forming the bottom of a receptacle, one set of the spaced members forming one end of the receptacle, another set of the spaced members forming the other end of the receptacle, a motor connected to the conveyor to drive the conveyor, a switch for the motor actuated by the weight of objects in the receptacle when the weight is made to cause said motor to operate to cause the conveyor to advance, means to stop the motor after it has advanced the conveyor, a counting mechanism and an operating member carried by the conveyor for operating the counting mechanism.

4. In a fruit weighing apparatus, a frame, a pair of opposed, spaced, endless chains mounted on said frame, said chains having parallel upper reaches, spaced rod supports connecting said chains, a set of spaced rods mounted on each support, said rods being directed upwardly from the upper reaches of the chains, a scale structure, said scale structure including a shaft mounted on said frame, a pair of spaced arms mounted on said shaft, each of said arms including a portion disposed adjacent to one of said rods, side plates carried by said arms, said side plates being spaced apart, with the chain carried rods movable therebetween, a plurality of spaced fingers mounted on said shaft, each finger including an inclined portion and a horizontal portion, said horizontal portions being spaced between said rods, said side plates forming the sides of a receptacle, said fingers forming the bottom of the receptacle and one set of said rods forming the rear end of said receptacle and another set of side rods forming the forward end of said receptacle, means to direct fruit to said receptacle, a motor connected to the chains to drive the chains, a switch for the motor actuated by the weight of objects in the receptacle when the weight is made to cause said motor to operate to cause the chains to advance, means operated by a chain to stop the motor, a counting mechanism and an operating member carried by one of the chains for operating the counting mechanism.

5. In a fruit weighing apparatus, a frame, a pair of opposed, spaced, endless chains mounted on said frame, said chains having parallel upper reaches, spaced rod supports connecting said chains, a set of spaced rods mounted on each support, said rods being directed upwardly from the upper reaches of the chains, a scale structure, said scale structure including a shaft mounted on said frame, a pair of spaced arms mounted on said shaft, each of said arms including a portion disposed adjacent to one of said rods, side plates carried by said arms, said side plates being spaced apart, with the chain carried rods movable therebetween, a plurality of spaced fingers mounted on said shaft, each finger including an inclined portion and a horizontal portion, said horizontal portions being spaced between said rods, said side plates forming the sides of a receptacle, said fingers forming the bottom of the receptacle and one set of said rods forming the rear end of said receptacle and another set of side rods forming the forward end of said receptacle, means to direct fruit to said receptacle, said scale structure including a weight arm, means to pivotally support the weight arm on the frame, means spaced from said last means to pivotally connect the weight arm to the first mentioned arms, a motor connected to the chains to drive the chains, a switch for the motor actuated by the weight of objects in the receptacle when the weight is made to cause said motor to operate to cause the chains to advance, means operated by a chain to stop the motor, a counting mechanism and an operating member carried by one of the chains for operating the counting mechanism.

6. In a fruit weighing apparatus, a frame, a pair of opposed, spaced, endless chains mounted on said frame, said chains having parallel upper reaches, spaced, transversely extending rod supports connecting said chains, a set of spaced rods mounted on each support, said rods being directed upwardly from the upper reaches of the chains, a scale structure, said scale structure including a shaft mounted on said frame, a pair of spaced arms mounted on said shaft, each of said arms including a portion disposed adjacent to one of said rods, side plates carried by said arms, said side plates being spaced apart, with the chain carried rods movable therebetween, a plurality of spaced fingers mounted on said shaft, each finger including an inclined portion and a horizontal portion, said horizontal portions being spaced between said rods, said side plates forming the sides of a receptacle, said fingers forming the bottom of the receptacle and one set of said rods forming the rear end of said receptacle and another set of side rods forming the forward end of said receptacle, means to direct fruit to said receptacle, said scale structure including a weight arm having U-shaped end portions, means to pivotally support the U-shaped end portions on the frame, means spaced from said last means to pivotally connect the U-shaped end portions to the arms, a motor connected to the chains to drive the chains, a switch for the motor actuated by the weight of objects in the receptacle when the weight is made to cause said motor to operate to cause the chains to advance, means operated by a chain to stop the motor, a counting mechanism and an operating member carried by one of the chains for operating the counting mechanism.

PAUL M. BOLIEK.

REFERENCES CITED

The following references are of record in the file of this patent:

UNITED STATES PATENTS

| Number | Name | Date |
| --- | --- | --- |
| 580,066 | Staunton | Apr. 6, 1897 |
| 1,065,596 | Dick | June 24, 1913 |
| 2,088,334 | Merchen | July 27, 1937 |